United States Patent
McQuighan et al.

(10) Patent No.: US 11,188,392 B2
(45) Date of Patent: Nov. 30, 2021

(54) SCHEDULING SYSTEM FOR COMPUTATIONAL WORK ON HETEROGENEOUS HARDWARE

(71) Applicant: Algorithmia, Inc., Seattle, WA (US)

(72) Inventors: Patrick Xavier McQuighan, Seattle, WA (US); Kenneth F. Daniel, Seattle, WA (US); James F. Athappilly, Seattle, WA (US); Ahmet Besir Kurtulmus, Seattle, WA (US); James Joseph Sutton, Halifax (CA); Diego M. Oppenheimer, Seattle, WA (US)

(73) Assignee: Algorithmia inc., Seattle, WA (US)

( * ) Notice: Subject to any disclaimer, the term of this patent is extended or adjusted under 35 U.S.C. 154(b) by 0 days.

(21) Appl. No.: 16/136,075

(22) Filed: Sep. 19, 2018

(65) Prior Publication Data

US 2019/0155660 A1    May 23, 2019

Related U.S. Application Data

(60) Provisional application No. 62/561,190, filed on Sep. 20, 2017.

(51) Int. Cl.
*G06F 9/455* (2018.01)
*G06F 9/48* (2006.01)
(Continued)

(52) U.S. Cl.
CPC ............ *G06F 9/5077* (2013.01); *G06F 9/455* (2013.01); *G06F 9/45533* (2013.01);
(Continued)

(58) Field of Classification Search
CPC ........ G06F 9/455; G06F 9/48; G06F 9/45533; G06F 9/45558; G06F 2009/45562;
(Continued)

(56) References Cited

U.S. PATENT DOCUMENTS

| 9,015,724 B2 * | 4/2015 | Druyan ................... G06F 9/505 718/104 |
| 2003/0041088 A1 * | 2/2003 | Wilson .................. G06F 9/4411 718/104 |

(Continued)

*Primary Examiner* — Charles M Swift

(57) ABSTRACT

The technology includes methods, processes, and systems for virtualizing graphics processing unit (GPU) memory. Example embodiments of the technology include managing an amount of GPU memory used by one or more processes, such as Application Programming Interfaces (APIs), that directly or indirectly impact one or more other processes running on the same GPU. Managing and/or virtualizing the amount of GPU memory may ensure that an end user does not receive a GPU out-of-memory error because the API request is impacted by the processing of other API requests. A virtual machine with access to a GPU may be organized with one or more job slots that are configured to specify the number of processes that are able to run concurrently on a specific virtual machine. A process may be configured on each virtual machine running a software program or API and is used to schedule work based on GPU memory requirements.

12 Claims, 11 Drawing Sheets

(51) Int. Cl.
    *G06F 9/50*         (2006.01)
    *G06F 9/54*         (2006.01)
    *G06T 1/20*         (2006.01)

(52) U.S. Cl.
    CPC ............ *G06F 9/45558* (2013.01); *G06F 9/48* (2013.01); *G06F 9/4806* (2013.01); *G06F 9/4843* (2013.01); *G06F 9/4881* (2013.01); *G06F 9/4887* (2013.01); *G06F 9/50* (2013.01); *G06F 9/5005* (2013.01); *G06F 9/505* (2013.01); *G06F 9/5011* (2013.01); *G06F 9/5022* (2013.01); *G06F 9/5027* (2013.01); *G06F 9/5044* (2013.01); *G06F 9/5061* (2013.01); *G06F 9/546* (2013.01); *G06T 1/20* (2013.01); *G06F 2009/45562* (2013.01); *G06F 2009/45575* (2013.01); *G06F 2009/45579* (2013.01); *G06F 2009/45583* (2013.01); *G06F 2209/501* (2013.01); *G06F 2209/503* (2013.01); *G06F 2209/5011* (2013.01); *G06F 2209/5013* (2013.01); *G06F 2209/548* (2013.01)

(58) Field of Classification Search
    CPC . G06F 2009/45575; G06F 2009/45579; G06F 2009/45583; G06F 9/4806; G06F 9/4843; G06F 9/4881; G06F 9/4887; G06F 9/50; G06F 9/5005; G06F 9/5011; G06F 9/5027; G06F 9/5044; G06F 9/505; G06F 9/5061; G06F 9/5077; G06F 9/546; G06F 2209/501; G06F 2209/5011; G06F 2209/5013; G06F 2209/503; G06F 2209/548; G06T 1/20

See application file for complete search history.

(56) References Cited

U.S. PATENT DOCUMENTS

| | | | |
|---|---|---|---|
| 2009/0201303 A1* | 8/2009 | Westerhoff | H04L 51/00 345/520 |
| 2009/0241117 A1* | 9/2009 | Dasgupta | G06F 9/5038 718/101 |
| 2013/0191612 A1* | 7/2013 | Li | G06T 15/005 712/30 |
| 2014/0331222 A1* | 11/2014 | Zheng | G06F 9/45558 718/1 |
| 2014/0337836 A1* | 11/2014 | Ismael | G06F 21/56 718/1 |
| 2015/0143364 A1* | 5/2015 | Anderson | G06F 9/5088 718/1 |
| 2015/0169350 A1* | 6/2015 | Anand | G06F 9/45558 718/1 |
| 2015/0178124 A1* | 6/2015 | Modani | G06F 9/4881 718/102 |
| 2015/0236971 A1* | 8/2015 | Sesha | H04L 47/70 709/226 |
| 2016/0092275 A1* | 3/2016 | Booman | G06F 9/4881 718/103 |
| 2017/0083365 A1* | 3/2017 | Zhao | G06F 9/4881 |
| 2017/0238002 A1* | 8/2017 | Prins | H04N 7/12 375/240.24 |
| 2018/0365072 A1* | 12/2018 | Li | G06F 9/5038 |
| 2019/0004868 A1* | 1/2019 | Zhou | G06F 9/5055 |

* cited by examiner

SCHEDULING SYSTEM FOR COMPUTATIONAL WORK ON HETEROGENEOUS HARDWARE

CROSS-REFERENCE TO RELATED APPLICATIONS

This application claims priority to and the benefit of the filing of U.S. Provisional Patent Application Ser. No. 62/561,190, filed on Sep. 20, 2017, entitled "SCHEDULING SYSTEM FOR APPLICATION PROGRAMMING INTERFACES ON HETEROGENEOUS HARDWARE" (Client Reference No. 065-001PR0), and the specification, claims, and figures thereof are incorporated herein by reference.

BACKGROUND

Requests, such as program requests, application requests, application programming interface (API) requests, and the like, which require a machine with access to a graphics processing unit (GPU) to process the request can use varying amounts of memory, at various times in their lifecycle. Generally, memory restrictions are not put on machines with access to GPUs, which can lead to requests using too many resources, such as GPU memory, and interfering with other users or other requests. GPU memory usage can be a problem in multiple ways, such as while a machine is actively handling a request or after the request has completed because GPU memory is not freed.

Currently, GPU memory is not managed or virtualized in a manner like how CPU memory is managed, so the amount of GPU memory taken by one process directly impacts another process. It is difficult to enforce an actual limit on the amount of resources, such as GPU memory, that a request can be allowed to use. Lack of enforcement can cause problems where a system has more than one user running API requests at a time, such problems may include efficiency or scheduling problems when more resources are requested than are available.

BRIEF DESCRIPTION OF THE DRAWINGS

The foregoing will be apparent from the following more particular description of example embodiments of the technology, as illustrated in the accompanying drawings. The drawings are not necessarily to scale, emphasis instead being placed upon illustrating embodiments of the present invention.

Various embodiments in accordance with the present disclosure will be described with reference to the drawings, in which.

DETAILED DESCRIPTION

Figure 1:
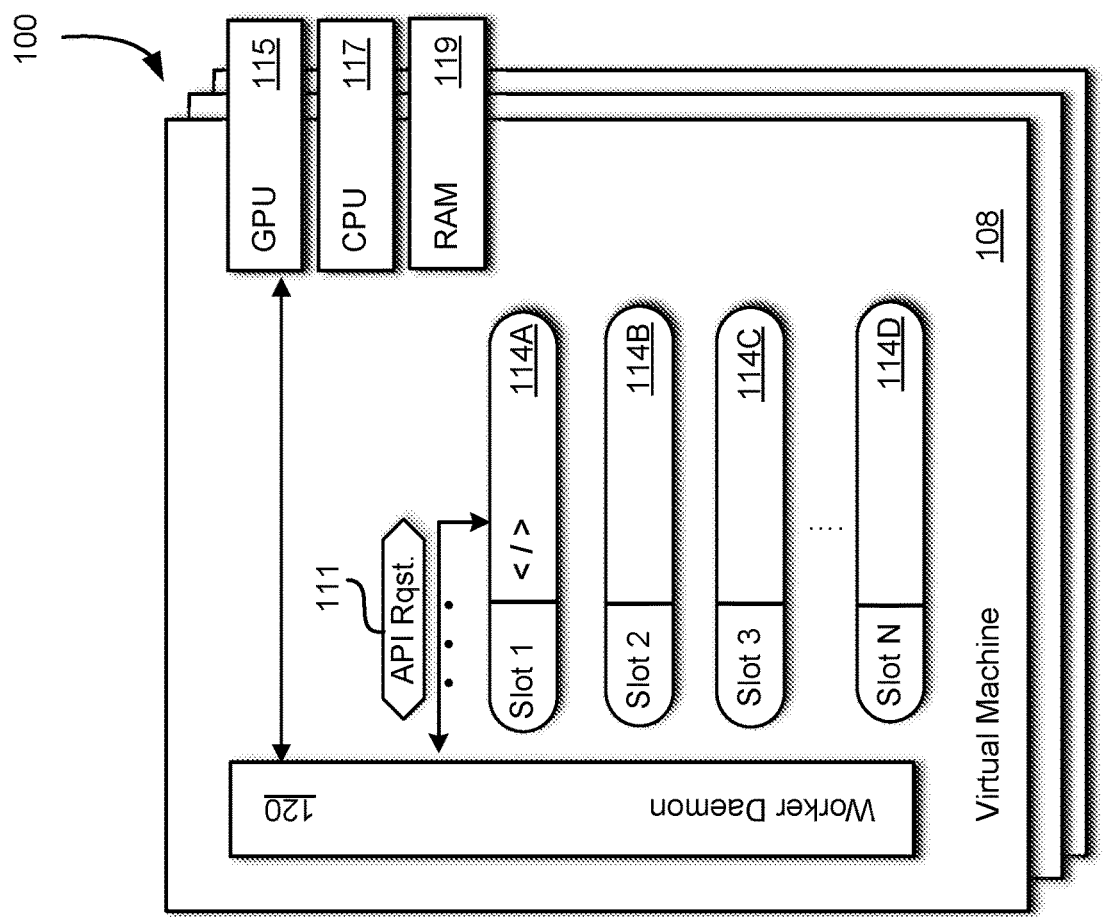
FIG. 1 illustrates an example computing environment in accordance with some embodiments of the subject technology.
Figure 1:
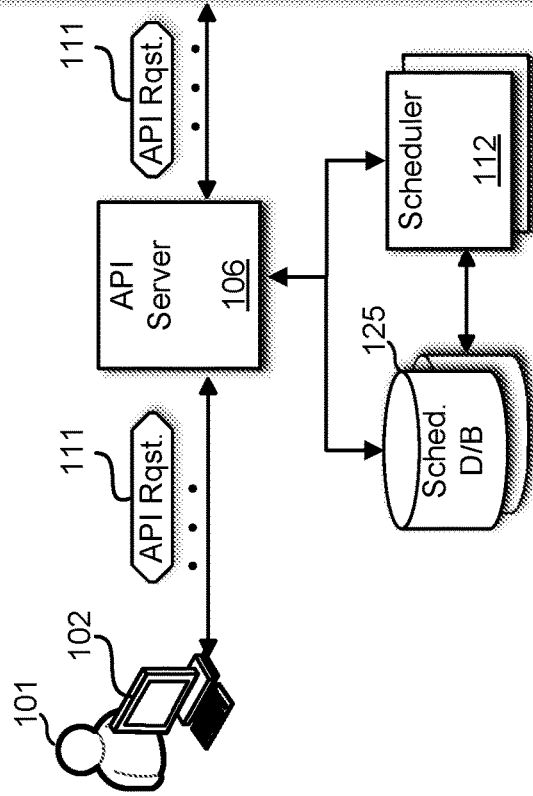

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Techniques described and suggested herein include methods, processes, and systems for virtualizing graphics processing unit (GPU) memory. Generally, GPU memory is not managed so the amount of memory taken by one process directly impacts another process. If a single process, such as an application programming interface (API) request to process user data according to an algorithm, is actively running/being executed on a GPU, no other processes may be run on that same GPU despite the amount of GPU memory being used by the process. A GPU according to example embodiments presented herein may be configured to load one or more processes at the same time.

Example embodiments include a method, process, system, and computer-readable medium to implement one or more memory virtualization layers for a parallel computing platform and application programming interface (API) model. The parallel computing platform may be a software layer configured to provide access, such as direct access, to a graphics processing unit (GPU) for general purpose processing, also referred to as General-Purpose Computing on Graphics Processing Units (GPGPU). GPGPU generally refers to the use of a GPU configured to perform computations in applications traditionally performed by a central processing unit (CPU).

A GPU may be configured as an integrated component with a CPU on a same circuit, graphics card, and/or motherboard of a physical endpoint device, such as a computer, computing device, or server. Example embodiments presented herein may also refer to CPUs and GPUs generally, where such units may be a virtual CPU and/or a virtual GPU. A virtual GPU is generally configured to render graphics on a virtual desktop via a virtual machine, where graphical instructions may be relayed via a proxy, such as hypervisor, from a virtual desktop to a physical GPU. For example, a virtual GPU is a computer processor configured to render graphics on a server, such as a host server, of a virtual machine, as opposed to rendering the graphics on a physical device, such as a physical hardware device. A virtual GPU may be configured to offload graphics processing power from a server CPU in a virtual desktop infrastructure. However, GPUs and virtual GPUs may be configured to and/or enabled to perform highly parallelizable, complex calculations and determinations that are currently not considered, and which are described herein. A virtual CPU, also referred to as a virtual processor, may include a physical CPU being assigned to a virtual machine. While example embodiments presented herein discuss applications with reference to a virtual machine for simplicity and consistency, some or all of the embodiments may be performed on hardware or circuits of a physical endpoint device.

Typically, a GPU (example depicted in FIG. 8), which is a specialized computer processor, performs computations for computer graphics, such as real-time or near real-time graphics compute-intensive processes, or other highly parallelizable computations, such as neural networks, machine learning systems, and/or general artificial intelligence. For purposes of simplicity in explanations herein, example embodiments will be described with reference to API requests; however, it will be understood by those having ordinary skill in the art that example embodiments and implementations of the processes, systems, and non-transitory computer-readable mediums can further be used with and/or for mathematical calculations, complex algorithms, intensive applications, and other processes. For example, a GPU may be configured to perform algorithmic and/or mathematical calculations for computation-intensive applications that may otherwise strain a CPU and/or degrade performance of such calculations, results, or outcomes of the computed process.

FIG. 1 illustrates an environment 100 in which a user 101 may transmit a request to be processed according to one or more example embodiments.

API requests that may use or require GPUs can use varying amounts of resources, such as GPU memory, at various times in the lifecycle of the API. If no restrictions are placed on the API usage of the GPU, it can lead to APIs using too many resources and interfering with other APIs from the same or other users. For example, APIs may persist across multiple requests and the memory usage may vary during different stages of the API lifecycle.

Example embodiments include managing an amount of resources, such as GPU memory, used by one or more processes, such as Application Programming Interfaces (APIs), that directly or indirectly impact one or more different/other processes. Managing and/or virtualizing the amount of GPU memory may ensure that an end user, such as a user transmitting an API request that is processed via one or more GPUs, does not receive a GPU out-of-memory error because the API request is impacted by the processing of one or more other API requests.

In the example embodiment depicted in FIG. 1, a user 101 may transmit an API request 111 through an application executed by the user's client 102, such as a user's computing device. An API server 106 may include a scheduler module 112 configured to initialize one or more processes on a single host or virtual machine and is further configured to route traffic to a specific slot on a specific host, e.g., a specific virtual machine, such as VM 108. The scheduler module 112, which can be a software agent, daemon, processor, or the like, may communicate with one or more API servers (e.g., one or more virtual machines/servers configured to provision the virtual machines) and/or be operably connected to a scheduling database 125 for use in scheduling API requests.

A computer program or software agent, such as a background-running process or daemon process configured to run on a machine or virtual machine being monitored, may be configured to run on one or more virtual machines (also referred to as "workers" or "hosts"). Using a worker daemon 120, one or more processes may be configured to route user traffic, such as API request 111, to specific slots 114a-d running on the virtual machine 108. The worker daemon 120 may be further configured to initialize, start, and/or stop slots on the VM. The worker daemon may be operably connected with a scheduler 112, such as a process to schedule traffic or determine the scheduling of API requests received from one or more API servers. The scheduler module 112 may be directly connected to the worker daemon 120 or be operably connected via the API server 106.

In one example embodiment, when an API request 111 is received at an API server 106, a scheduler module 112 connected to the API server 106 determines, based at least in part on information provided in the request 111, information from the worker daemon 120, and/or information from the scheduling database 125, on which virtual machine the API requests will be processed. For example, the API server may assign the API request to be run in a specific slot of a specific virtual machine (VM).

The specified VM executes the API requests and provides it with access to the GPU if necessary according to information related to or from the API, API request, database, or other source of information/input/data; or if decided by same to be used with the GPU. The worker daemon 120 for the specified VM 108 maintains information related to the accessed GPU 115, such as how much GPU memory is available at that specific moment in time. The worker daemon may further have access to information, via the scheduling database and/or API database, such as when additional GPU memory will become available. The worker daemon for the specified VM may further calculate the available GPU memory based, at least in part, on currently running, loading, and/or holding APIs also present in different slots of the specified VM (see FIG. 5B).

The scheduler module 112 may further be configured to create a map associating each API request 111 and a process identifier (PID) (not shown), which may identify the process running the specific API request on the host 108. In some example embodiments, no maps may be created, or only a set or subset of PIDs may be created in a map. The PID may be used to allow processes to be manipulated such as adjusting the API request's priority, changing the status of the API request, terminating the API request, or the like. For example, when an API request is executed in a certain slot, the PID for that slot is known by the worker daemon. An API request, such as API request 111, may include the API to be run on the system, a model file, user account information, an Internet Protocol (IP) address, data/input to be used, an API version, a memory expectation, and/or other data that is related to processing the API request. Such information, whether received in an API request or from other requests, may be stored in the scheduling database 125. A scheduling database 125 may be operably connected with the worker daemon 120 and/or the scheduler module 112 to store information related to the GPU 115, CPU 117, RAM 119, and/or additional information related to VM 108.

The worker daemon 120 may further be configured to poll or monitor one or more GPUs 115 on a constant, intermittent, random, or determined schedule to determine a status of the one or more virtual machines with GPU memory and/or resources available. For example, a GPU status may include how much GPU memory is available, how much GPU memory is being used by other processes, what the GPU processor rate is, and other characteristics related to GPUs.

The API server 106 may be operably interconnected to the scheduling database 125 or one or more other databases that maintains and updates such information related to APIs. The API database may include information and statistics gained from other received requests, when a user creates a new API or algorithm, what language an algorithm is written in, what requirements an API request needs, the expected memory usage acquired over time, and other API specific information.

The scheduler module 112 may be configured to measure an amount of memory used by an API. The scheduler module may measure an amount of memory used after loading the API, memory usage while an API is active in a slot, peak memory usage while the API is active (e.g., loading, loaded, running, working, etc.) in a slot, memory usage after an API request is complete, or other such measurements to determine an amount of available and/or used GPU memory. The memory usage may be recorded in the scheduling database to indicate what APIs require, need, and/or request what amount of memory. The memory used by an API may also be determined based on the version of the API, such as a version of the API based on an update of the API, added features to the API, or other changes to the API that would change the version from the original API.

In further example embodiments, the API server 106 determines which slot to assign an API request 111 to by determining a slot "score." A slot score may be determined according to whether the slot is currently processing another request, how long a used slot will be engaged, whether the slot is empty, whether the slot is loaded with some or all of the input or data needed for another API request, information received from the worker daemon such as the amount of GPU memory available to the slot, whether a slot can be reused if it is already loaded, or other information related to the slots on the VM. The API server 106, via the scheduler 112 or separately, may additionally determine attributes or requirements an API might have to influence selection of specific VMs or slots in a VM. For example, selection may be based at least in part on the type of file, whether an API is cached on any available or unavailable VMs, whether the API calls other APIs or sub-processes, whether the sub-processes are currently loading, loaded, or cached on any available or unavailable VMs. A score may be calculated for a slot on the VM. In other example embodiments, a score may also be calculated for each slot on every VM and/or on a subset of VMs. It should be noted that scoring and slot determination may be made in other methods including combinations, variants, and alternatives not provided herein.

In alternative example embodiments, in place of the API server 106 or the scheduler 112 assigning the API request to a specific slot, the slot can be selected based on resources used. For example, the worker daemon 120 for the virtual machine 108 selected can determine if the slots of the VM can be assigned. The number of slots on a VM can be immutable or variable such that the worker daemon can determine if the VM is being under-utilized or over-utilized. Based on the use determination, slots may be added or removed from the VM dependent, at least in part, upon available information to the worker daemon, such as the amount of GPU memory available. For example, if the worker daemon for the VM determines that the number of slots 114a-d are only using a small amount of GPU memory, the VM can add more slots so more requests may be assigned to the VM to better use the GPU resources available to the VM. The slots may be immutable or variable in size; for example, all slots on a specific VM may be 1 GB each, or slots may vary in the amount of memory allotted to them. In some example embodiments, an API request may occupy multiple slots in a single VM. For example, if an API request needs 7 GB of GPU memory, the API request could be assigned to two slots of a VM, where each slot provides 3.5 GB of GPU memory.

In some example embodiments, a database can record and monitor the status of an API call. For example, the database can determine that a certain API call is slow, so when an API takes a long time to load but takes a short time to run, the API can be maintained in a permanent or semi-permanent slot, referred to herein as a sticky slot or a persistent slot. The persistent slot may determine that a container is constantly running for that particular API. The database, such as an analytics database, can be maintained to analyze the types of APIs that require persistent slots, the user of the persistent slots, and other related data about the API, such as load time, run time, memory usage, expected value, etc. In other example embodiments, an API server, also referred to as an API virtual machine, is configured to receive an API request from a user to get the requirements for the API request (e.g., GPU, language, memory needs, files, cached APIs, etc.).

Figure 2:
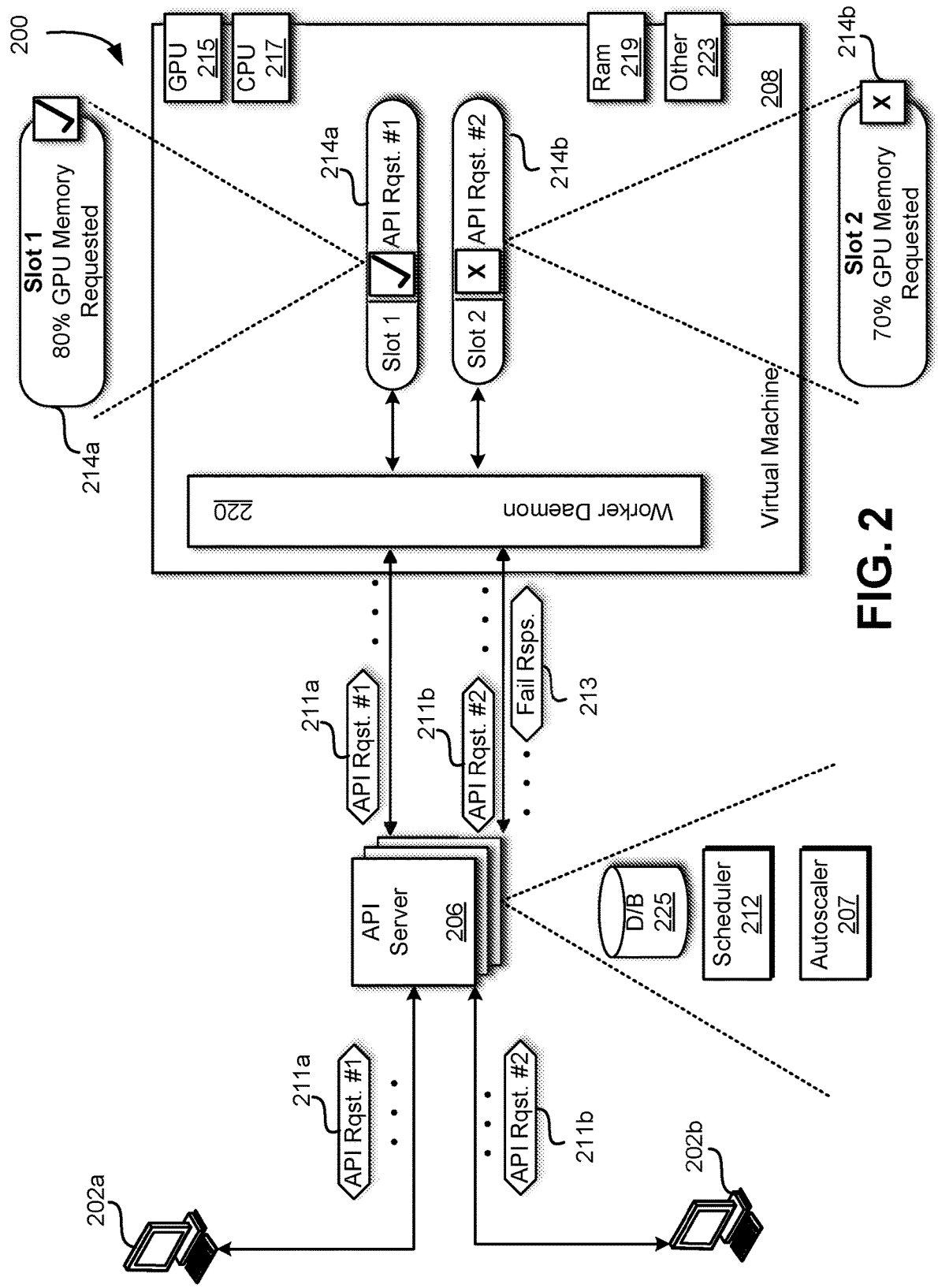
FIG. 2 illustrates an example computing environment in accordance with some embodiments of the subject technology.

FIG. 2 illustrates an example computing environment 200 in accordance with some embodiments of the subject technology.

If the Application Programming Interface (API) server 206, being operably interconnected to each worker daemon 220 of each VM 208 with access to a GPU 215, determines that the current slot on a specific VM to which the API request was allocated does not actually have enough GPU memory available to run the request without a failure, partial failure, error, etc., the API server may transfer, transmit, and/or assign the request to a different VM with more GPU memory available. When such a transfer is successful, the new assignment may be made without transmitting an error message to the user based on the possible failure of being in the original GPU VM slot without enough memory.

If a given slot ends up using more memory than expected the worker daemon 220 will start rejecting API requests (to other APIs) and will begin transmitting messages or information to the API server 206 that slot X is using lots of GPU memory. If requests continue to be rescheduled on this worker, the API server will, at some point, see slot X is using too much memory and evict it. If the API server 206 or worker daemon 220 determines or surmises that all API requests require 6 GB of memory, then failures would only happen if multiple API requests are starting at the same time, which use more than 6 GB. As soon as a VM acquires too much memory, new requests, such as API request #2 (211b) will be rejected and a failure response 213 may be returned to the user. The API server may be configured to route around workers in such a state.

For example, two API requests are allocated to different slots of the same VM, where API request #1 (211a) is assigned to slot 1 (214a) of the VM 208 and API request #2 (211b) is assigned to slot 2 (214b) of the VM. If each of API request #1 and API request #2 is determined to require or request more than 50% of GPU memory, one or both of the requests must be reassigned. The worker daemon 220 may determine or approximate the GPU memory requirements of the requests based on, for example, an algorithm expectation determination provided in the API request or determined by the API server. If API request #1 (211a) is being processed but API request #2 (211b) has yet to be processed, API request #2 (211b) can be rejected or transferred. The worker daemon for the VM assigned to API requests #1 and #2 may determine that API request #2 (211b) can be transferred to a different VM with more GPU memory available without notifying the user of the API request #2 (211*b*) that a failure would have occurred if API request #2 would have run in the original VM.

The API server 206 or scheduler module 212 may be configured to provide request optimization from one or more clients 202*a-b*. Optimization, if two or more requests, such as a first request from a first client and a second request from a second client, are received at the API server 206 at or around the same time, may include information about the request, the API, the input in the request, or other information related to memory usage. In other example embodiments, the requests may be from the same client, contain the same input for the different requests, or other combinations. There may be any number of requests, clients, users, and/or input received. For example, if it is known that a first request runs for a certain amount of time, then the second request could be placed in a queue behind the first request to use the same slot in which the first request is loaded. This is because it may take less time to queue the second request, than to spin-up a new slot and/or a new VM, load the second request, and run the second request. For example, if it takes three minutes for an API to load in a slot, but the API runs/executes quickly, it may be beneficial to reuse the same slot that has the API pre-loaded with new input or data from one or more subsequent API requests. In other words, the API is loaded in a slot, and new data/input for the API is loaded into the same slot after the first API request was sent.

If all slots are currently used and no new API requests can be put anywhere, the new API requests 211*a-b* are put in a queue. This information is put into the scheduler 212 and queued requests may be prioritized into a score (this can happen before the scheduler or at the scheduler). In some example embodiments, if a slot cannot be found and the request is put into the queue, and then a slot is emptied when a different request finishes up. Before the slot is emptied of the API, the API server 206, and/or the worker daemon 220 may be configured to review queued requests to determine if queued requests could use the loaded slot and, if so, the VM 208 can pull from the queue to be put in that slot. In some such examples, the API server and/or the worker daemon may be configured to check for additional information in the queues, such as whether the request is from the same user or a different user. This may be considered separately from or in conjunction with the ranking/scoring of slots and may be based on evaluating the queue based on loaded APIs, for example.

If the queue (not shown) starts filling up, more workers, such as more virtual machines, may be added on, initialized, or spun-up. An autoscaler 207 may be a component of or operationally integrated with the scheduler 212; for example, the autoscaler may be a process or daemon of the API server 206 configured to be triggered to launch new VMs, add new slots to existing VMs, and/or designate more capacity to a VM in a GPU pool (see FIG. 3). In example embodiments when the scheduler 212 is unable to perform the function, for example when the scheduler is backed-up/lagging and unable to process the amount of work and/or requests received, the autoscaler 207 may perform the same or similar functions to assist the overworked scheduler.

In further example embodiments, the autoscaler 207 may be configured to destroy or teardown the virtual machines when one or more VMs are no longer needed. A VM may no longer be need due to lack of incoming requests, time of day, use of historical data (e.g., daily or weekly patterns based on previous number of workers, requests), use of neural networks to predict and/or determine capacity needed, or other reasons. In many embodiments, the autoscaler 207, alone or in combination with other modules such as the scheduler 212, may provide for extra capacity to handle additional requests, such as incremental or sudden increases in request volume. The autoscaler 207 may be configured to predict, attempt to predict, or forecast how long (e.g., time) and how many (e.g., numbers/amounts of) requests in the queue may be acknowledged before the API requests time out. In further example embodiments, the autoscaler 207 may be configured to maintain a pool or series of stopped virtual machines to be started on an as-needed basis without further consideration of slots.

In some example embodiments, a level of fairness is added to the determinations by randomizing the queue. For example, the queue (e.g., such as a queue in the scheduler 212 or API server 206) may be randomly reordered to ensure a burst of calls (e.g., API requests) from a first user does not starve a second user making a single call. In other embodiments, the score may be manipulated by a randomness determination. For example, randomness may be assigned to a slot score to ensure the same slot or same VM is not always selected, to ensure the scores between slots are not always decided in the same manner, to ensure VMs with many empty slots are not always left empty, etc. Slot scores may further be adjusted with the ability to consider some or all the variables and introducing information about the VMs and/or slots so as to spread the workload over different available resources.

In other example embodiments, if a virtual machine or host (being connected and/or operably connected to a GPU 215, a CPU 217, a random access memory (RAM) 219, and/or other resources/hardware 223) does not have X amount of memory available at that moment, the schedule module may be configured to return the API request back to the API server. The API server will transmit the API request to another VM. At or around the same time as the request transfer, the API server will update the scheduling database regarding available memory. The API server can further transmit a response to the user of the API request explaining the transfer of the API request.

Figure 3:
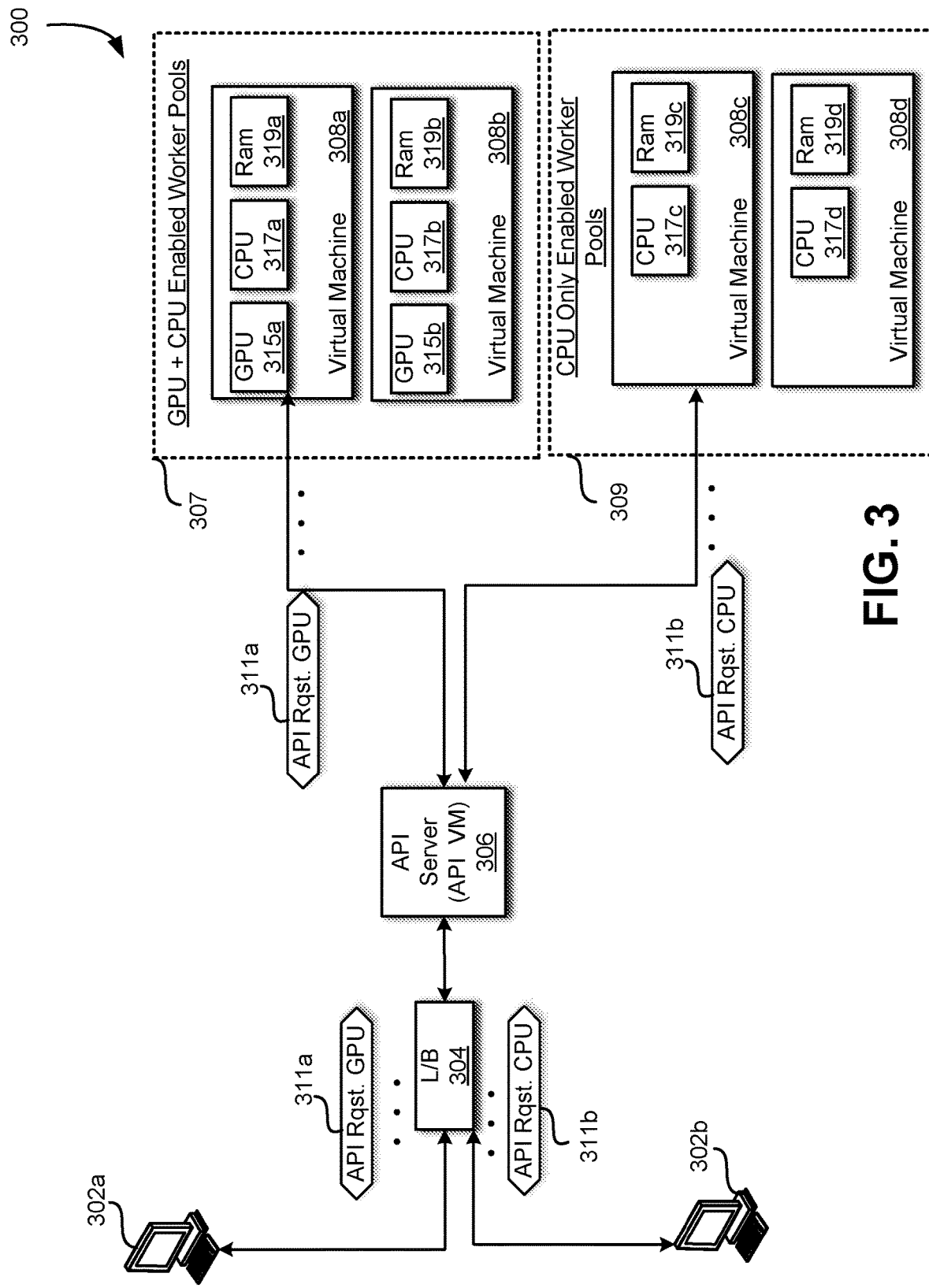
FIG. 3 illustrates an example computing environment in accordance with some embodiments of the subject technology.

FIG. 3 illustrates an example computing environment 300 in accordance with some embodiments of the subject technology.

A processing server, such as the API server 306, is operably interconnected to one or more worker pools 307 and 309, configured to receive processing requests directly from clients 302*a-b* or via one or more load balancers 304. The worker pools consist of GPU and CPU enabled virtual machines 307 and CPU only enabled virtual machines 309. A first processing request 311*a* is received at the processing server 306, which determines the request 311*a* requires or would be benefited by the use of a GPU-enabled virtual machine. As such, the processing request 311*a* is assigned to VM 308*a* by one of the processing servers 306 receiving the request. When a processing request is received at processing server, the request contains information as to what the request might need. In some example embodiments, the request received directly from the client 302*a* may only include the process and input data to be run. Once the process request is received at the processing server, the processing server can determine how much memory the request is likely to take, how much GPU memory could be needed, if the request requires a GPU, if the request requires any special or different requirements, or the like.

The processing server 306 is further configured to determine a worker pool, such as a pool of virtual machines, which may be used to process a request 311*b* that only require or may be suited for CPU-only enabled VMs, such as VMs 308c-d. The worker pools may include CPU only workers, CPU and GPU workers, or virtual machines with other characteristics. Worker pools may be created as more virtual machines are needed based at least in part on incoming request load. Worker pools may include any number of virtual machines and may be located in different regions and data centers around the world. Worker pools may further consist of physical machines, virtual machines, a combination of virtual and physical machines, or the like.

Once a worker pool is selected, the processing server 306 assess each virtual machine 308a-d in the selected worker pool 307 and/or 309 to determine if the request can be assigned to a specific VM. The processing server 306 may be configured to use information stored in the monitoring database and/or a scheduling database (see FIGS. 1 and 4) as necessary, required, and/or considered. Once a VM is selected, the processing server 306 further determines a slot on the chosen VM to which to assign the request. In common parlance this may be referred to as receiving work (e.g., job, request, message, etc.) into a slot, pod, or other container. In alternative example embodiments, the processing server 306 may not select a specific or exact VM and/or slot, but instead place the request in a queue. In such embodiments, an available VM and/or an available slot may retrieve the request without having a predetermined location.

Multiple types of pools, pools for CPUs, pools for GPUs, or pools for other types of hardware currently known or hereinafter used in the art, to help with scheduling/for scheduling purposes/for use with the scheduler. Pools may be divided based on hardware type, region, size limits, or other constraints.

Figure 4:
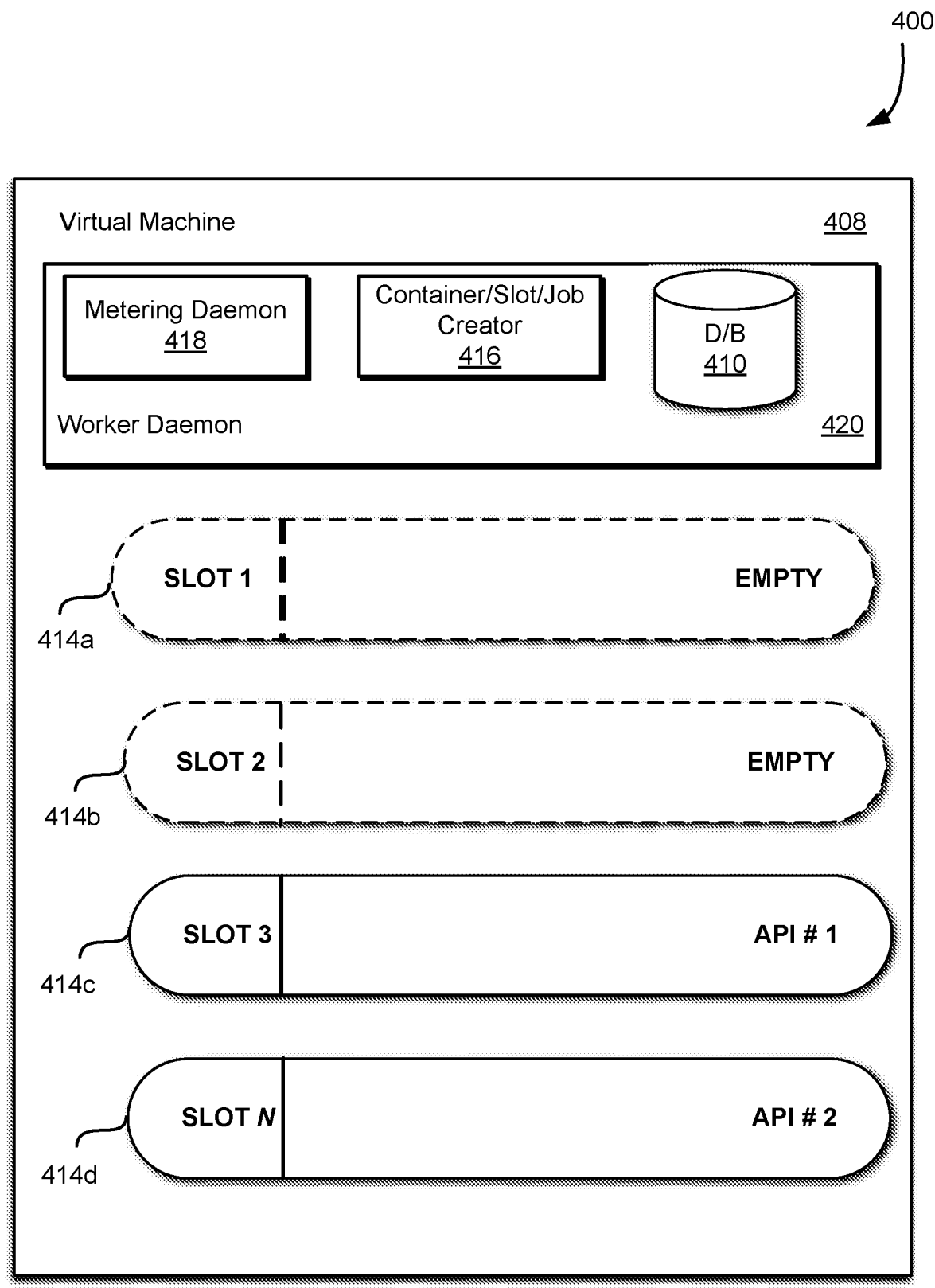
FIG. 4 conceptually illustrates a virtual machine, such as the virtual machine shown in FIGS. 1-3, in accordance with some embodiments of the subject technology.

FIG. 4 conceptually illustrates virtual machine components 400, such as the virtual machine shown in FIGS. 1-3, in accordance with some embodiments of the subject technology.

In one example embodiment, a virtual machine (VM) 408 with access to a GPU may be organized with one or more slots, such as job slots 414a-d, that are configured to specify the number of processes, for example the number of API requests, that are allowed or able to run concurrently on a specific virtual machine. A VM generally cannot run more concurrent jobs than it has slots. The size of a slot may be defined as the memory, CPU, and/or GPU resources that reservation requirements for the specific virtual machine. The slots may be a logical representation of the GPU memory made available to the virtual machine. A slot creator module 416 may divide each virtual machine or host machine into a fixed or variable number of slots and assign requests to available free slots (for example, the scheduler may assign API requests to free slots based on a round-robin algorithm, lowest slot number first, first-in-first-out queue consideration, or other allocation schemes).

In one example embodiment, a worker daemon 420, which may be a daemon or other process, is configured on each virtual machine 408 running a software program or API, and is used to schedule work based, at least in part, on GPU memory requirements. The worker daemon 420 or other process is configured to track available memory at a GPU; the worker daemon may determine the currently available memory at the time when a user request, such as an API request, is received. The worker daemon 420 for each VM 408 monitors the slots 414a-d on each VM. The worker daemon polls the slots of its VM to determine if the accessible GPU maintains enough available memory for the API request in the assigned slot to be run.

The worker daemon 420 may further be configured to determine an approximate amount of available memory at or around the time an API request is received. The worker daemon 420 may further be configured to determine that the API request may be scheduled when there is enough free GPU memory. If there is not enough free GPU memory, for example, if there are no available or free slots, the worker daemon may determine if memory may be made available by evicting an API loaded in a slot or otherwise occupying (e.g., loading, running, working, etc.) the slot.

The worker daemon 420 may include a metering daemon 418 to receive and record user logs, to determine expected memory usage, and to adjust the expected value, such as the expected amount of GPU memory usage. In alternative example embodiments, the scheduler module (not shown) may be configured to determine and adjust the expected value and record the same in a database. The metering daemon 416 may be configured to update a database 410 so that information is up-to-date for the next API request. Expected resource usage could be an expected runtime and this would allow for queuing API requests for the same APIs already loaded in a specific slot. For example, expected usage could be A amount of memory, B amount of time, and/or C percentage of memory. The worker daemon 420 may further be configured to update the database 410 constantly, intermittently, or at another determined or random interval to determine the status of a GPU and/or GPU resources for the specific VM associated with the worker daemon.

The worker daemon 420 may determine if the unavailable slots, such as slot 3 (414c) and/or slot 4 (414d), may be evicted to provide additional space, and, if so, use the evicted space to begin the API request. If no available slots are found, and no slots can be evicted to provide additional space, the worker daemon can return the API request to a work queue, such as a queue in a RabbitMQ database, Kafka database, SQL database or the like, to allow the API server to reschedule the API request to another VM. The worker daemon 420 may further return the API request to a queue in an in-memory database, a message queuing system, or other similar constructs. In alternative example embodiments, the scheduling may be performed by the API server instead of the worker daemon or scheduler.

In some example embodiments, an API may maintain a model file. The model file may store a learned portion of the API. For example, in many cases, a machine learning algorithm consists of two parts. A first part is the algorithm itself and a second part is the model that is learned from the data being processed by the API. For example, a single neural network trained on different data sets or different input, where one model learns to recognize nudity (for use by a nudity detection API) and a second model learns to recognize color (for use by a color detection API). The model file may store at least the learned part (e.g., processed portion or partially processed portion) of the API even though the neural network itself is the same for both APIs. In some example embodiments a model file may be bundled or incorporated with the API code itself. In alternative example embodiments, the model file could be stored in an external database that is configured to be accessible by the API via worker daemon or component thereof, such as database 410.

In some example embodiments, an API may be configured to query, contact, or otherwise interact directly with the database 410 to retrieve available data or information related to the API. The worker daemon 420 may further be configured to perform as a proxy for data, such as a model file, which may include handling authorization for access to the data, local caching of the data, logging of data requests, and the like. A scheduler, such as the scheduler module 112 of the API server 106 as depicted and described in connection with FIG. 1, may be configured to account for usage patterns of APIs. For example, if an API always requires access to the same data or model file, the scheduler may be configured to execute that API on a VM that has the data cached and/or available.

Returning to FIG. 4, the slot creator 416 may be a daemon may be configured to monitor the status of API requests being processed in the specific VM 408. For example, the slot creator 416 can be configured to monitor if the APIs are loading, loaded, running, idle, terminating, etc. in their assigned slots. The slot creator 416 can further determine if an API request being run is going to fail partially through its processing. If so, the worker daemon 420 may pause the current level of running of the API request and transfer the partially-processed data and the API request to a different VM that has the available memory for the API request to be continued and completed instead of restarting the API request from the beginning.

Alternative example embodiments may include a scheduler module transmitting a saved state of the processed API request to serialize to a different slot on a different GPU VM to continue working on the saved state. For example, an API that includes a stateless algorithm, process, or API, e.g., an API or process that does not make network calls, then a snapshot of the memory can be transmitted to the different GPU VM.

In alternative example embodiments, a VM may not have a predetermined number of slots but may allocate slots or resources dynamically. In other words, slots or containers may not be used on the host or virtual machine at all or in part. The VMs may be configured to query the queue, such as a queue in the API server 106 or the scheduler 112 as described and depicted in connection with FIG. 1, to retrieve queued processes, jobs, API requests (work) as one or more VMs have resources available. For example, a VM that has available resources will contact a central work queue to receive new or updated work.

Returning to FIG. 4, as is depicted in some example embodiments, slots are not a fixed construct, as such the scheduler creates and terminates slots as needed. However, using the scheduler as a queue to maintain a list of requests, enables the worker daemon 420 to retrieve requests from the queue without determining if slots are available and/or without requiring an API server or scheduler to initialize a specific amount of resources, e.g., a slot, on the VM.

Figure 5A:
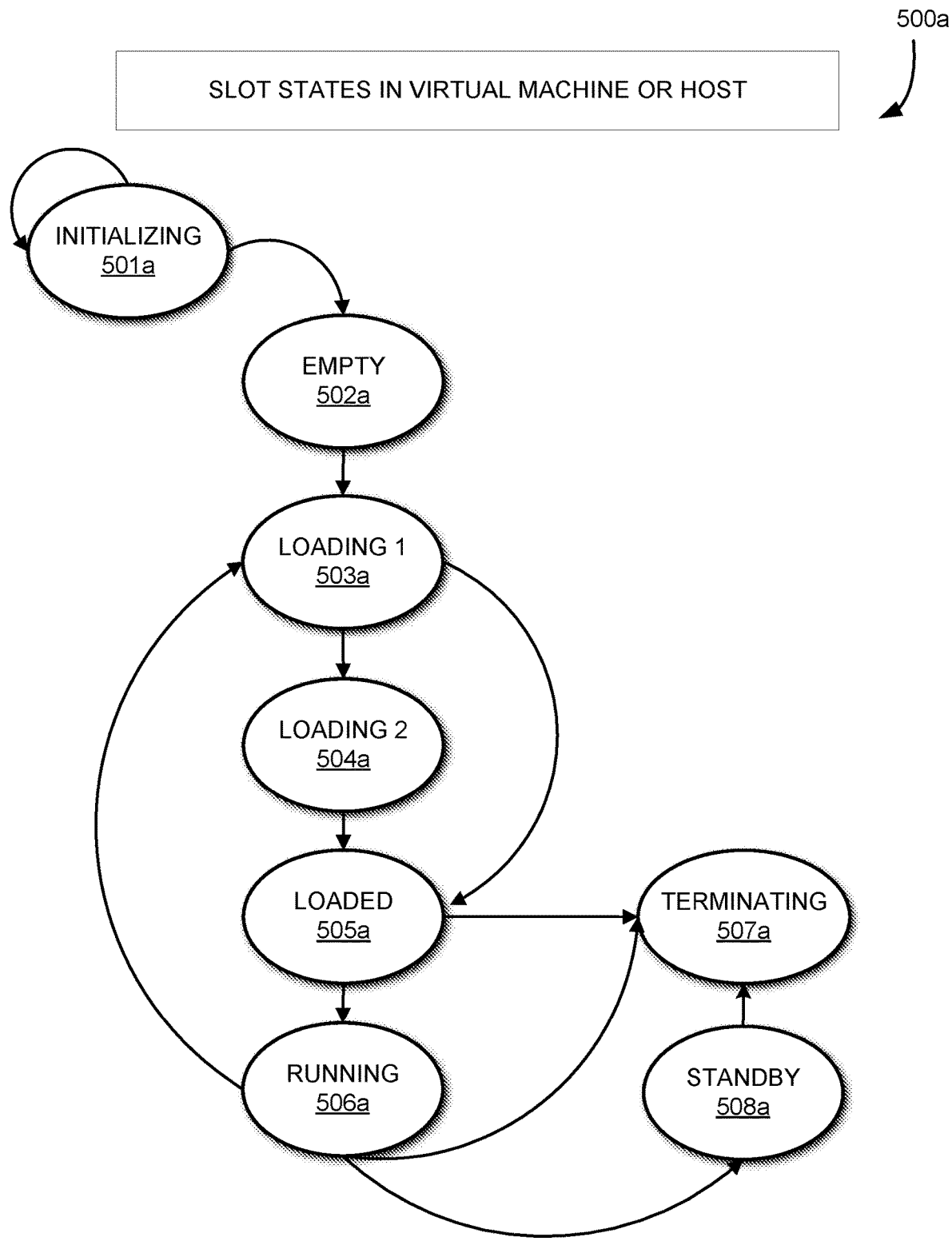
FIG. 5A is an illustrative example of a state diagram that specifies a few of the different possible states of slots in a host in accordance with at least one embodiment shown.

FIG. 5A is an illustrative example of a state diagram 500A that specifies a few of the different possible states of slots in a host in accordance with at least one embodiment shown.

Slots, including persistent slots, may have varying number of states such as empty, first loading, second loading, loaded, standby, running, evicted, terminated, or more. Each of these states can use different amounts of GPU memory and this is a variable that is maintained by the worker daemon 120, or other process such as the API server 106 or scheduler 112 as depicted and descripted in connection with FIG. 1, so that the slots available on that VM can be changed/varied.

Returning to FIG. 5A, at the INITIALIZING state (501*a*), the process of entering an API into a slot of a virtual machine begins, which turns to the EMPTY state (502*a*) upon determination that there is an available slot. Post creation of the slot, the LOADING 1 state (503*a*) uploads some or all of the initialized/requested API. An empty slot state, such as slots 1 or 2 (414*a-b*) as depicted in FIG. 4, may represent a slot that is available where no API or process is loaded or, in alternative examples where no API is running. Returning to FIG. 5A, a first loading slot state may represent a slot that has been claimed for a load request and a slot is being created.

The status of the slot changes from the LOADING 1 state (503*a*) to the LOADING 2 state (504*a*) in some embodiments where the runner (executor code) determines additional data, code, and/or other information is necessary, required, requested, and/or considered before completing the loading process of the API. In other embodiments, where the runner determines no additional information is necessary, required, or the like before completing the loading process of the API, the LOADING 1 state (503*a*) changes to a LOADED state (505*a*).

Once the API is effectively loaded and being executed, the LOADED state (505*a*) may persist until either the API is terminated, or the API is running. If the API is terminated, the LOADED state (505*a*) changes to a TERMINATING state (507*a*). If the API is running, the LOADED state (505*a*) changes to a RUNNING state (506*a*)

When an API or process is still running in a slot, but no new information or data is being received in the slot, the RUNNING state (506*a*) changes to a STANDBY state (508*a*). For example, a standby slot state may indicate a state that still has a job running in the slot. The indication may mean that the entire VM is scheduled to be shut down and all the slots running on the VM or just a specific slot running on the VM are to be terminated, but work is still being processed or completed. The standby state may represent that a worker is preparing for a shutdown, and new work is no longer assigned to that slot while work is being drained. The STANDBY state (508*a*) changes to a TERMINATING state (507*a*) when the VM is preparing to be shut down. For example, a terminated slot state may indicate a state that is finished with the running of the API request, the API is unloaded from the slot and is not in memory, though other slots on the same machine are still in standby, active, or other states such that the entire VM cannot be terminated.

In alternative example embodiments, a runner (e.g., executor) is used to abstract between different programming languages that interconnects the code to be run to the rest of the platform. For example, the runner (or executor code) handles communication into and out of one or more slots. A first loading slot state may represent a slot that has been claimed for a load request and a slot is being created. This may indicate that the runner has not been announced and may therefore not have received the actual load request yet. A second loading state may represent a runner that has been initialized and been sent an actual load request. This may indicate that the slot is starting to run an API or process load.

In alternative example embodiments, such as those alternative embodiments described in connection with FIG. 4 above, the states depicted in FIG. 5A may not be associated with specific slots but may otherwise correlate to an amount of free resources, such as GPU memory, available on a given virtual machine or host. The available resources may be determined according the state diagram; however, the need or use of slots is no longer dependent upon the states.

Figure 5B:
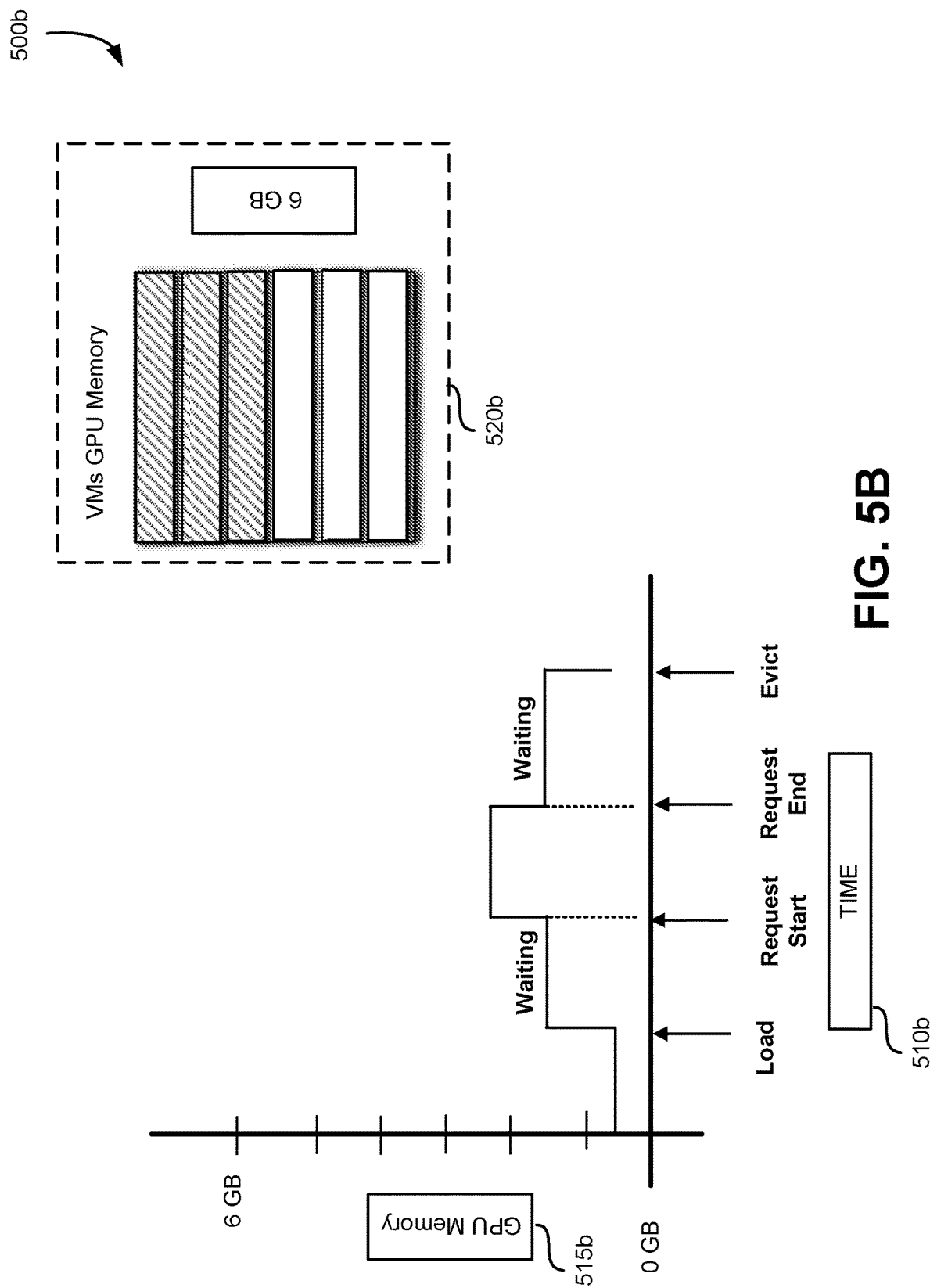
FIG. 5B is an illustrative example of a graph showing GPU memory over time in a host machine in accordance with at least one embodiment shown.

FIG. 5B is an illustrative example of a graph 500B showing GPU memory 515*b* over time 510*b* in a host machine in accordance with at least one embodiment.

To schedule resources, it is generally necessary to know how much resources a given request will need. In some example embodiments historical data can be used to determine exactly or approximately how much resources are needed. For example, an API request can be expected to use X amount of GPU memory 520*b*, before the request runs.

For example, when an API request runs or executes, the amount of memory used is tracked historically, this information may be used to assume the same or similar amount of memory may be used or needed for scheduling new or future work.

For example, a user, such as an API developer, has an API that runs quickly but has a large load time. The user has published this API privately and uses it for an application that the user's customers call directly. The user has noticed that at seemingly random times, the API calls take dramatically longer than others. To alleviate this problem, the user can create and use a persistent slot for that API. This will make sure that there is always one or more slots for that caller with the API the user wants to run. If the time between subsequent calls to the API is slower than the time it takes to complete the call, the calls to the API from this user may never experience the "cold start" problem (e.g., an empty slot without data, input, processes, API, etc.).

When a program or process is executed there can be two phases; a first phase that may include loading before input data is received or needed and a second phase that may include actual processing of the request including the input data. When the loading of an API, such as a neural network for example, takes a long time, a user may want to maintain the neural network loaded for as long as possible and as many requests as possible so there is no need to pay the loading cost (e.g., money, time, resources, etc.) multiple times. In other scenarios, when the loading of the neural network is fast/quick, the API can be unloaded and reloaded as needed without incurring as much cost. For example, preemptive APIs may be loaded based on scheduler in response to historical usage, forecasting data, heuristics, and/or other information.

For persistent slots, and regularly scheduled slots, a load request can be separate from an API request, such that a user can trigger a load request for a persistent slot without actually transmitting an API request. For example, a user can request to load an API, algorithm, or other process. At which point the request begins to run and is then completed, then the API, algorithm, or other process is maintained in a loaded state in the persistent slot. If the persistent slot is to be ended, as in the container is to be terminated, the API or algorithm is evicted from the persistent slot.

Figure 6:
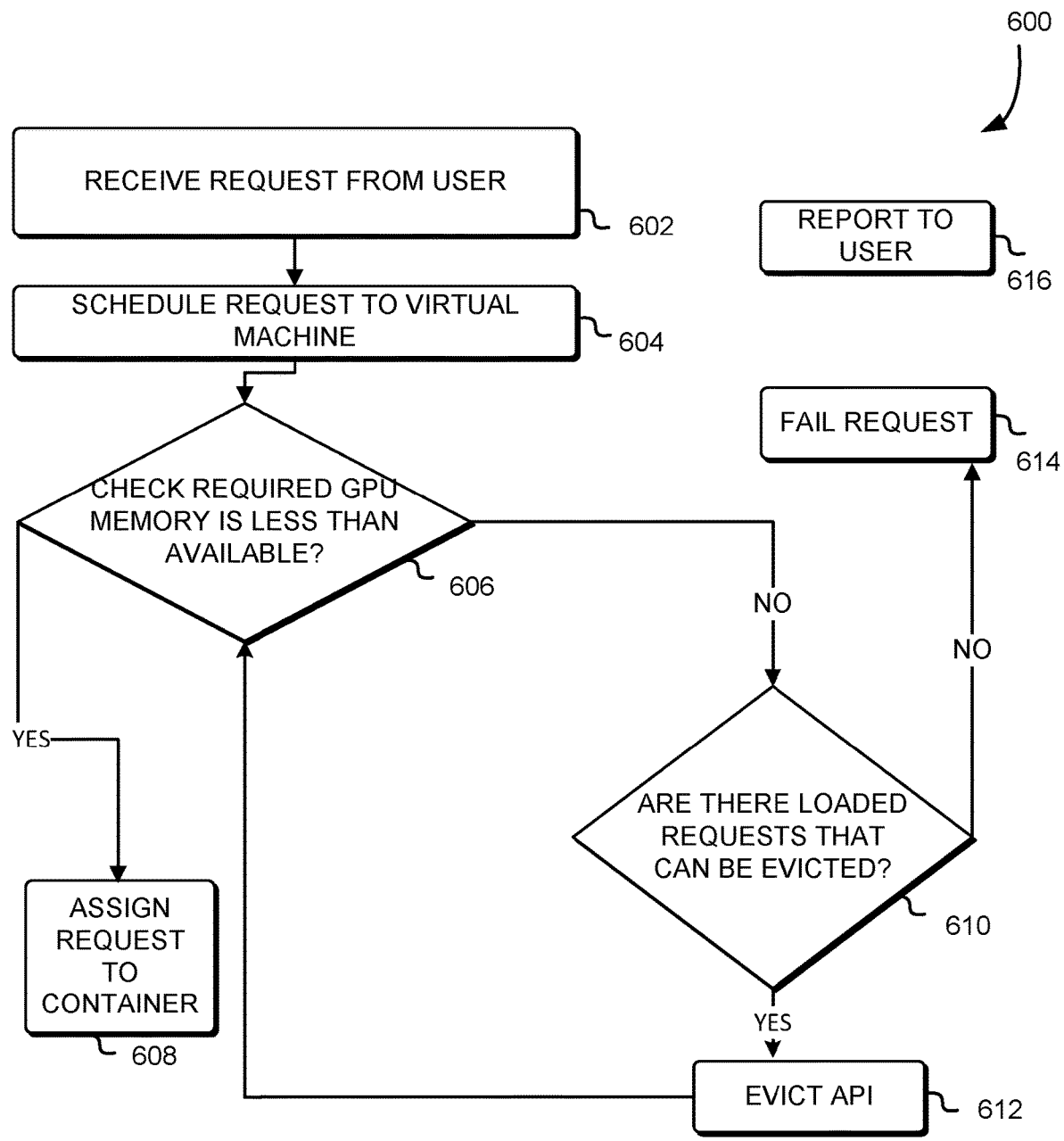
FIG. 6 illustrates an example process for performing process request allocation to a host that can be utilized in accordance with various embodiments.

FIG. 6 provides an illustrative example of the process 600, which may be used to schedule a user's request to an available host based, at least in part, on available GPU resources. The process 600 may be performed by a suitable system or component of a system described herein, such as the API server 106, the scheduler 112, and/or the worker daemon 120 described above in connection with FIG. 1.

Returning to FIG. 6, the process 600 includes receiving a request from a user via a user's client (602). The request may include any request to perform calculations, complex applications, or other processes, such as an application programming interface (API) request, to be processed using a GPU. The process 600 further includes scheduling the received request to a virtual machine (604). For example, the process 600 may receive an API request such as the API request 211a as described above and depicted in connection with FIG. 2.

Returning to FIG. 6, as a result of the scheduling of the API request, the process 600 further includes determining if one or more GPUs operably connected to the scheduled virtual machine contain enough available memory to load and/or execute the API request (606). If the GPUs being connected to or accessible by the scheduled virtual machine maintain the required available memory, the process 600 further includes assigning the API request to a slot or container of the virtual machine (608). In some example embodiments provided herein, the API request may be assigned or scheduled to a VM according to a queuing system or process, as described in connection with FIGS. 3 and/or 4 above.

Returning to FIG. 6, if the GPU associated with the scheduled virtual machine does not have enough memory available for the received API request, the process 600 includes determining if there are any presently loaded APIs that may be evicted and/or terminated (610). For example, if a previously received API request was scheduled into a slot on the same virtual machine, where the loaded API could be removed, evicted, and/or terminated in order to provide resources for the received request. If it is determined that there are available loaded API(s) that may be evicted, the process 600 further includes evicting the determined API (612) and redetermines if there is available GPU memory available for the received API request (606).

If it is determined that there are no loaded API(s) that can be evicted from active slots, the process 600 further includes rejecting the API request or failing the API request (614). In response to a rejected or failed API request, the process 600 includes reporting the failed or rejected API request to the user (616). According to some example embodiments, the user may not receive a failed or rejected API request response.

Figure 7:
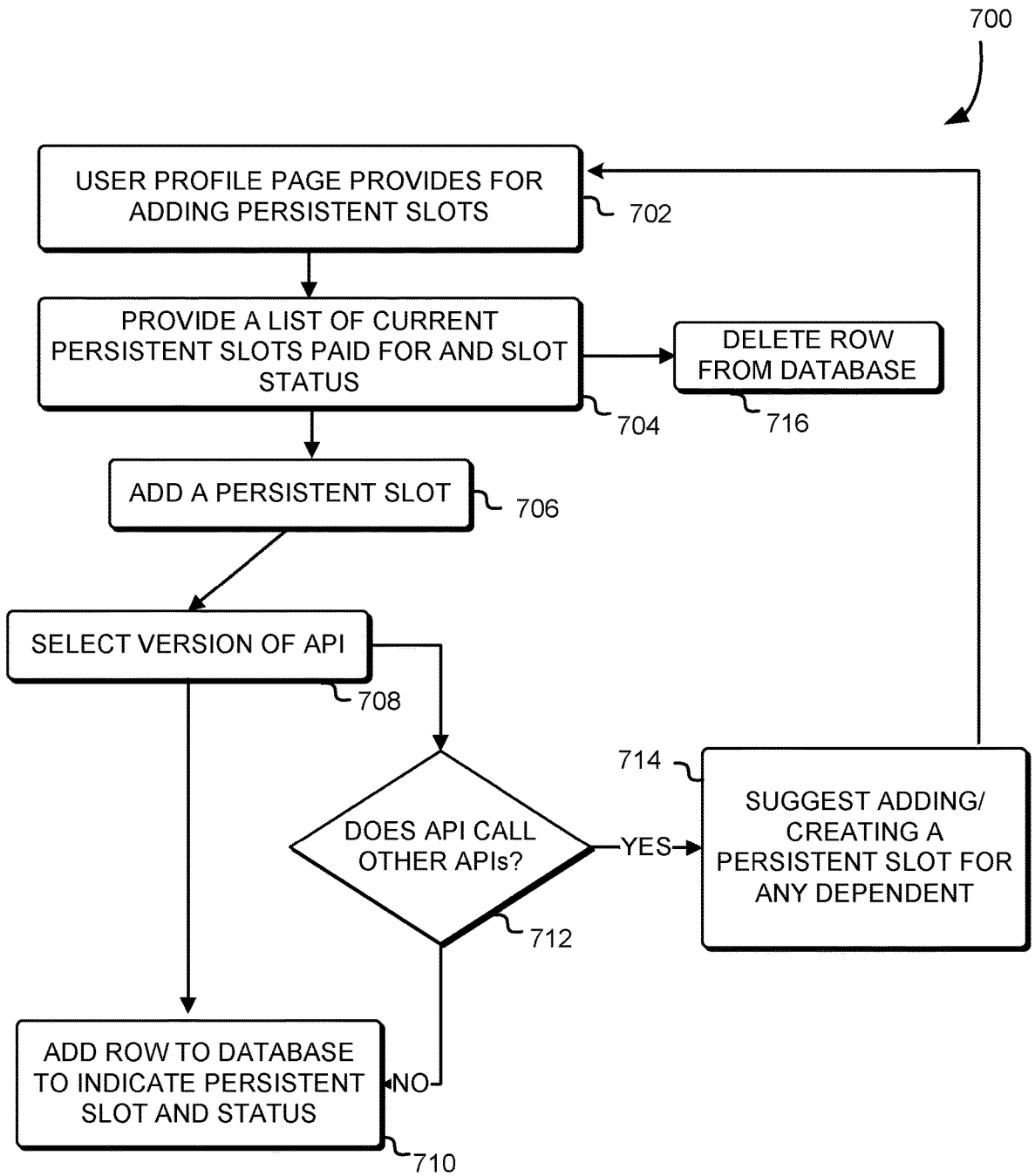
FIG. 7 illustrates an example process for performing process request allocation of persistent slots on a host that can be utilized in accordance with various embodiments.

FIG. 7 shows an illustrative example of the process 700, which may be used to create and/or schedule one or more persistent slots on one or more virtual machines in accordance with at least one embodiment. The process 700 may be performed by any suitable system, such as by a web server, such as the web server 1004 as illustrated and described in connection with FIG. 10 or any component operably connected thereto.

Returning to FIG. 7, the process 700 includes making available the option for a user to add a persistent slot for the user's continued or prolonged use of a specific space, such as a specific amount of resources or a specific amount of GPU memory associated with a virtual machine (702). In some example embodiments, the user may add a persistent slot to the user's profile, where said profile may be stored in one or more databases, such as the scheduling database 125 and/or the database 410 as described and depicted in connection with FIGS. 1 and 4, respectively. One or more databases may contain, include, record, and/or otherwise provide for information associated with a user, a client, an API request, an API, or other authentication and application details generally understood in the art. The one or more databases may further be controlled/managed by one or more services provided by or via a cloud service provider, such as the data storage service 934, the authentication service 935, and/or the metering service 936, as described and depicted in connection with FIG. 9 below. In some example embodiments, the one or more databases may further be associated with one or more database servers, such as the database servers 1006 as described and depicted in connection with FIG. 10 below.

Returning to FIG. 7, the process 700 further includes providing a list of current persistent slots paid for and the status of current persistent slots to the user (702). In response to a user's request transmitted through an application executed by the user's client, such as a user's computing device, the process 700 further includes providing for the deletion and/or disabling of a persistent slot from the database (716) and providing for the addition of a persistent slot to the database (706). In response to a request to add a persistent slot, the process 700 includes providing for the selection, if applicable, of a version of the API to be added, loaded, and/or stored in the persistent slot (708). The process 700 further includes determining if the selected version of the API calls or executes additional or other APIs or processes (712).

If the process 700 determines that additional APIs are called, e.g., if the requested API uses one or more child processes to execute, the process 700 further includes suggesting the addition or creation of a persistent slot for any dependent processes or APIs (714). In at least some example embodiments, the process 700 further includes creating a persistent slot for the requested API, which may include adding a row to a database to indicate the persistent slot and its associated status (710).

Some or all of the processes depicted in FIGS. 6 and 7, including process 600 and process 700, may be performed under the control of or according to the instructions of one or more computer systems configured with executable instructions. The processes 600 and 700 may be implemented as code (e.g., executable instructions, computer program(s), or application(s)) executing on one or more processors, by hardware, or combinations thereof. The code may be stored on a non-transitory computer-readable storage medium.

Figure 8:
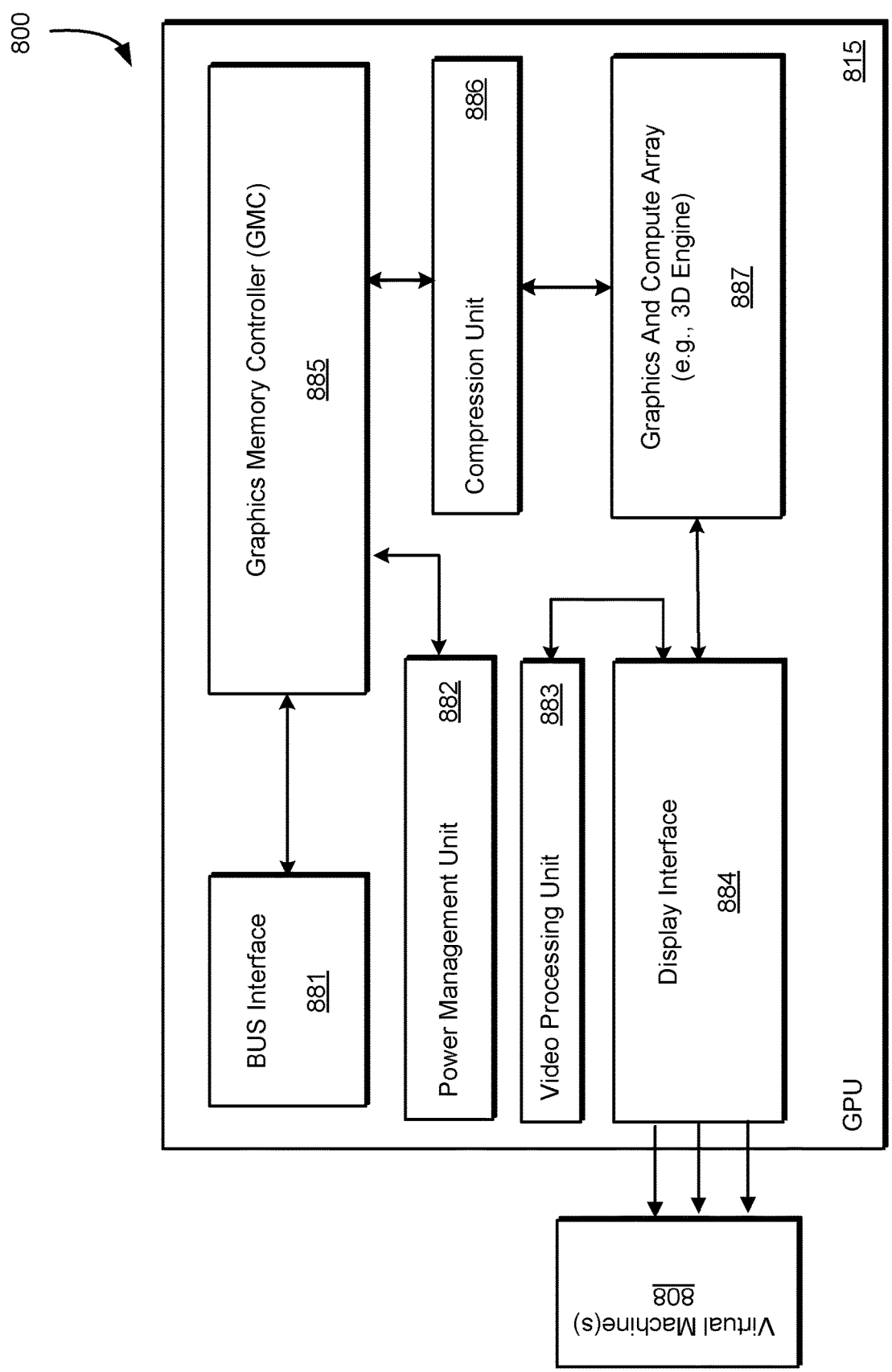
FIG. 8 is a block diagram illustrating exemplary components of a sample GPU in accordance with an embodiment.

FIG. 8 is a block diagram 800 illustrating exemplary components of a sample graphics processing unit (GPU) in accordance with an embodiment. The depicted example GPU 815 may include different components or subsystems operably interconnected. The components of example GPU 815 include a BUS interface 881, a graphics memory controller (GMC) 885, a compression unit 886, a graphics and compute array 887, a power management unit 882, a video processing unit 883, and a display interface 884. The display interface 884 may, for example, be operably interconnected to a host machine, such as a physical machine and/or a virtual machine operating according to a virtualization layer on a host machine. The GPU provided for in example embodiments enables more intensive processes to be loaded, executed, and completed in a manner that is more effective, more resource enhancing, and/or more likely to succeed than the same or similar processes being executed or attempted at being executed on a CPU. The example embodiment of a GPU in FIG. 8 depicts and describes components of the specialized computing machine and may be designed in other ways according to GPUs (virtual, physical, and/or a combination of virtual and physical) currently known or hereinafter considered in the relevant art.

Figure 9:
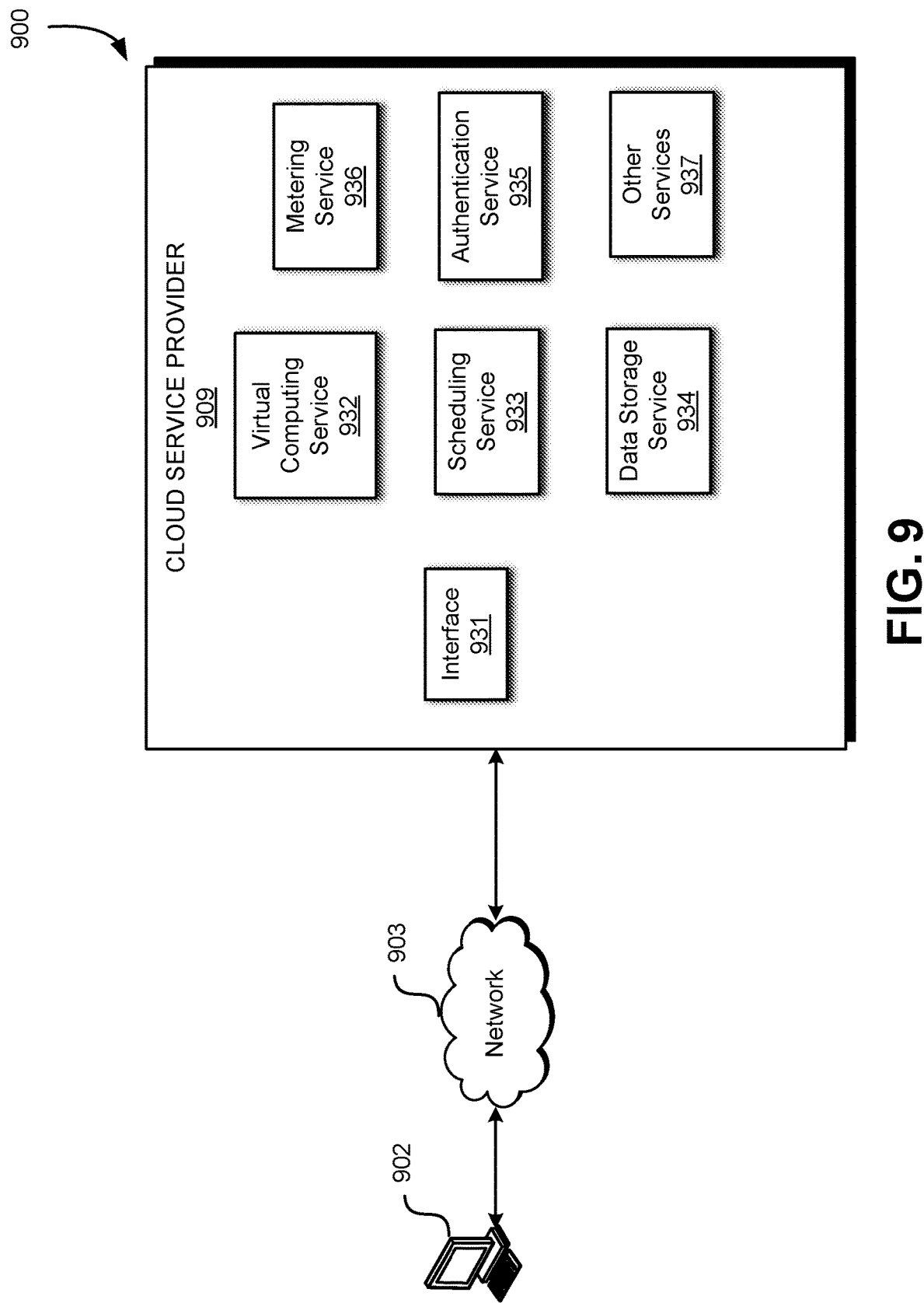
FIG. 9 illustrates example components of a client computing device in accordance with various embodiments.

FIG. 9 depicts one example 900 of a client 902 connected to a cloud service provider (CSP) 909 according to one embodiment. The CSP 909 may provide an assortment of services to a user through the user's client 902 over a network 903 via an interface 931, where the network may be any type of network. The interface 931 may be one or more web service interfaces where each of services 932-937 may include their own user interface. The user may communicate with the CSP 909 via a network 903, such as the Internet, to cause the operation of one or more embodiments described herein. The CSP 909 services provided to users according to this example include a virtual computing service 932, scheduling service 933, a data storage service 934, an authentication service 935, a metering service 936, and one or more other services 937. The one or more services may further be operably interconnected with one or more other services provided by the CSP 909, such as connected via one or more interfaces. Not all embodiments described herein include the services 931-937 and additional and/or alternative services may be provided.

The virtual computing service 932 may be a collection of computing resources configured to instantiate one or more virtual machines for use by the user. The user may communicate with the virtual computing service 932 to operate the virtual machines initiated on physical computing devices. In other example embodiments, other computer systems or system services may be employed that do not use virtualization and/or provision applicable computing resources on one or more dedicated physical devices, such as a web server or application server.

In one example embodiment, the scheduling service 933 may be a collection of computing resources to schedule requests to available resources. For example, scheduling may be provided to a virtual machine (VM) with access to a GPU may be organized with one or more slots, such as job slots, that are configured to specify the number of processes, for example the number of API requests, that are allowed or able to run concurrently on a specific virtual machine. A VM generally cannot run more concurrent jobs than it has slots. The size of a slot may be defined as the memory, CPU, and/or GPU resources that reservation requirements for the specific virtual machine. The slots may be a logical representation of the GPU memory made available to the virtual machine. A scheduler module may divide each virtual machine or host machine into a fixed or variable number of slots and assign requests to available free slots (for example, the scheduler may assign API requests to free slots based on a round-robin algorithm, lowest slot number first, first-in-first-out queue consideration, or other allocation schemes).

The CSP 909 of FIG. 9 further includes the data storage service 934, which may be implemented to synchronously and/or asynchronously process requests to access, store, create, or otherwise affect data. For example, the data storage service 934 may be configured to allow access and retrieval of data associated with a user, a client, a request, an API, or other object described herein to allow data to be provided in response to requests.

The authentication service 935 may be one or more computing resources that are configured to perform actions for authenticating a user. The metering service 936 may provide for users to submit requests related to the management of their user accounts, such as requests to add, delete, change, or modify account information, processing information, or other policy information. The cloud service provider 909 may further maintain one or more other services 937 based at least in part on the needs or wants of the provider 909, the network 903, the client 902, or other customer/user requests.

Figure 10:
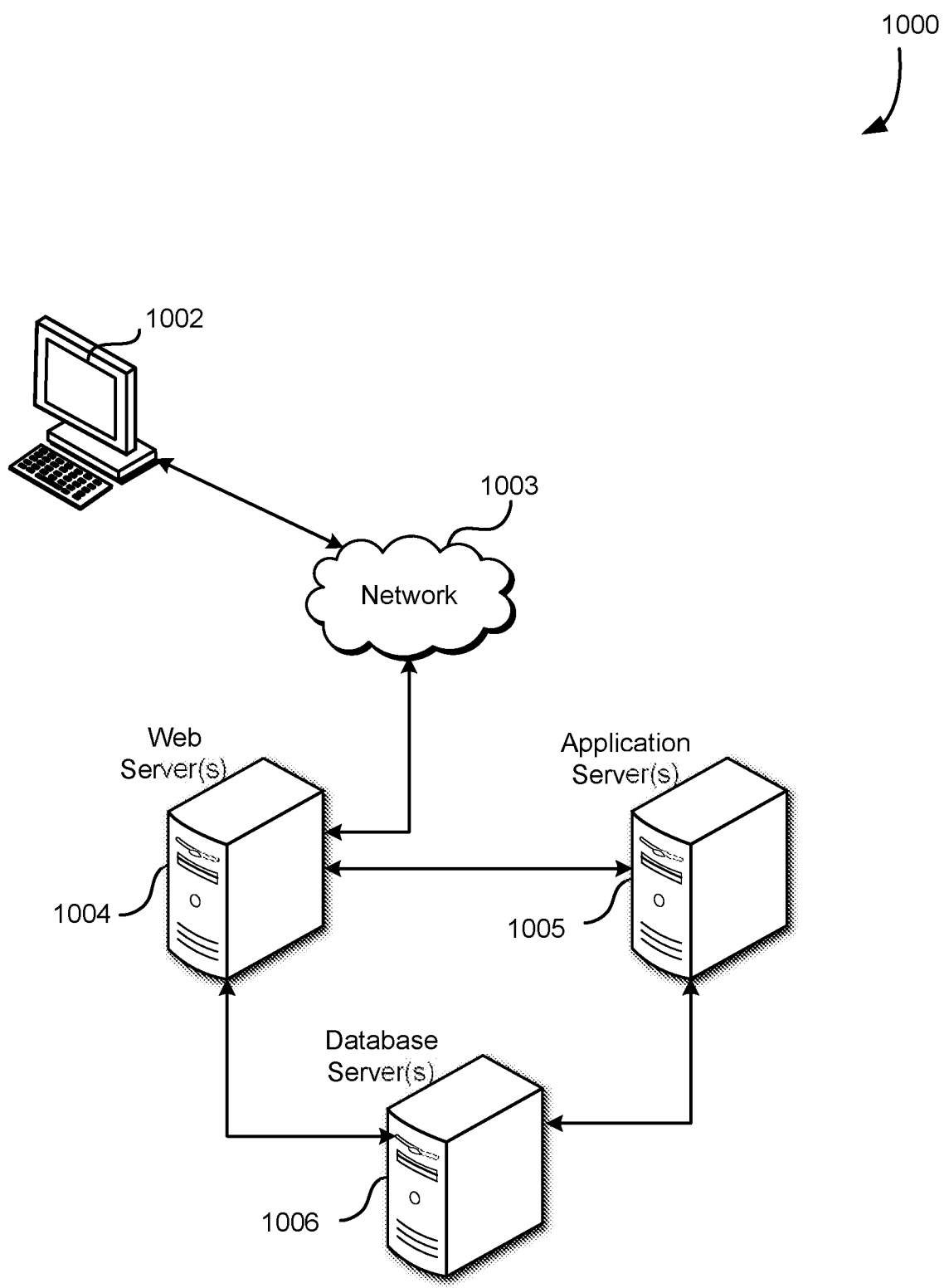
FIG. 10 illustrates an environment in which various embodiments can be implemented.

FIG. 10 illustrates aspects of an example environment 1000 for implementing aspects in accordance with various embodiments. While a web-based environment is used for purposes of explanation and depiction, those of skill in the art may recognize that different environments may be used to implement different embodiments provided herein. The environment 1000 includes a client device 1002, which can include any appropriate device operable to send and/or receive requests, messages, or other information, such as a personal computer, computer system, or computing device, over/via a network 1003, such as the Internet, a local area network, or other network type. These devices also can include other electronic devices, such as dummy terminals, thin-clients, gaming systems and other devices capable of communicating via a network. These devices also can include virtual devices such as virtual machines, hypervisors and other virtual devices capable of communicating via a network.

The example environment 1000 includes at least one web server 1004, at least application server 1005, and at least one database server 1006, each or all of which may include several servers, layers, process, and/or other components configured to interact according to example embodiments presented herein. The servers 1004-1006 may be implemented in various ways, such as hardware devices or virtual computing systems. In some contexts, servers may refer to a programming module being executed on a computing system. The database server(s) 1006 may include a device or combination of devices capable of storing, accessing, and retrieving data and/or may include any combination servers, databases, and storage devices in any standard, distributed, virtual, clustered, or otherwise organized environment.

The application server(s) 1005 may include any and all applicable software, hardware, and firmware for integrating with a database server(s) as needed to execute aspects of one or more applications and/or embodiments presented herein for the client device 1002. The application server(s) 1005 may provide services alone or in cooperation with the database server(s) and are able to generate content such as text, graphics, audio, video, and/or other content usable to be provided to the user. The management of requests and responses, as well as the delivery of content between the client device 1002 and the application server(s) 1005, may be accomplished by the web server 1004 using appropriate server-side structured programming languages, such as Python, Ruby, Perl, JAVA®, HTML, XML, or the like.

As will be understood by one of ordinary skill in the art, example embodiments presented herein may not require web and application servers, as structured code discussed herein can be executed on any appropriate device or host machine. In addition, embodiments and processes described herein may be performed collectively by multiple devices, which may form a distributed and/or virtual system.

The database server(s) 1006 are operable to receive instructions from and/or send instructions or otherwise process data in response to the instructions from to the application server 1005. The application server 1005 may provide static, dynamic, or a combination of static and dynamic data in response to the received instructions. Dynamic data, such as data used in web logs (blogs), shopping applications, news services and other such applications may be generated by server-side structured languages as described herein or may be provided by a content management system ("CMS") operating on, or under the control of, the application server.

Each server may include an operating system that provides executable program instructions for the general administration and operation of that server and typically will include a non-transitory computer-readable storage medium (e.g., a hard disk, random access memory, read only memory, CPU, GPU, etc.) storing instructions that, when executed by a processor of the server, allow the server to perform its intended functions. In some example embodiments, the server may be partitioned into kernels, which use a single operating system that provides executable program instructions. Suitable implementations for the operating system and general functionality of the servers are known or available, being readily implemented by persons having ordinary skill in the art, particularly in light of the disclosure herein.

The depiction of the system 1000 in FIG. 10 should be taken as being illustrative in nature and not limiting to the scope of the disclosure.

Various embodiments presented herein may utilize at least one network that would be familiar to those skilled in the art for supporting communications using any of a variety of commercially-available protocols, such as User Datagram Protocol (UDP), Transmission Control Protocol/Internet Protocol (TCP/IP), protocols operating in various layers of the Open System Interconnection (OSI) model, File Transfer Protocol ("FTP"), and other various protocols currently known or hereinafter applicable in the art. The network can be, for example, a local area network, a wide-area network, a virtual private network, the Internet, an intranet, an extranet, other similar type networks, and any combination thereof.

In embodiments utilizing a web server, such as web server 1004, the web server may be configured to run any of a variety of server or mid-tier applications, including Hypertext Transfer Protocol (HTTP) servers, File Transfer Protocol (FTP) servers, Common Gateway Interface (CGI) servers, data servers, Java servers, Apache servers, and business application servers. The server(s) also may be capable of executing programs or scripts in response to requests from user devices, such as by executing one or more web applications that may be implemented as one or more scripts or programs written in any programming language, such as JAVA®, C, C# or C++, or any scripting language, such as Ruby, PHP, Perl, Python, or TCL, as well as combinations thereof.

The environment can include a variety of data stores and other memory and storage media as discussed above. These can reside in a variety of locations, such as on a storage medium local to (and/or resident in) one or more of the computers or remote from any or all of the computers across the network. Necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit (CPU or processor), an input device (e.g., a mouse, keyboard, controller, etc.) and at least one output device (e.g., a display device, printer, etc.). Such a system may also include one or more storage devices, such as disk drives, optical storage devices, and solid-state storage devices such as random access memory (RAM) or read-only memory (ROM), as well as removable media devices, etc.

Such devices also can include a computer-readable storage media reader, a communications device (e.g., a modem, a network card (wireless or wired), etc.), and working memory as described above. The computer-readable storage media reader can be connected with, or configured to receive, a computer-readable storage medium, representing remote, local, fixed, and/or removable storage devices, as well as other such devices for temporarily, semi-permanently, or permanently containing, storing, transmitting, and retrieving computer-readable information. Storage media and computer readable media for containing code, or portions of code, can include any appropriate media known or used in the art, including storage media and communication media, such as, but not limited to, volatile and non-volatile, removable and non-removable media implemented in any method or technology for storage and/or transmission of information such as computer readable instructions, data structures, program modules or other data. Based on the disclosure and teachings provided herein, a person of ordinary skill in the art will appreciate other ways and/or methods to implement the various embodiments The specification and drawings are, accordingly, to be regarded in an illustrative rather than a restrictive sense. It will be evident that various modifications and changes may be made thereunto without departing from the broader spirit and scope of the invention as set forth in the claims. Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions and equivalents falling within the spirit and scope of the embodiments or technology, as defined in the appended claims.

The use of the terms "a," "an," "the," and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected," when unmodified and referring to physical connections, is to be construed as partly or wholly contained within, attached to, or joined together, even if there is something intervening. The terms "operably connected" or "operably interconnected" and the like may refer to virtual and or physical connections and are to be construed as partially or wholly contained within, attached to, or joined together, even if there are intermittent constructs or components. Recitation of ranges of values herein are merely intended to serve as a shorthand method of referring individually to each separate value falling within the range, unless otherwise indicated herein and each separate value is incorporated into the specification as if it were individually recited herein. The use of the term "set" (e.g., "a set of requests") or "subset" unless otherwise noted or contradicted by context, is to be construed as a non-empty collection comprising one or more members. Unless otherwise noted or contradicted by context, the term "subset" of a corresponding set does not necessarily denote a proper subset of the corresponding set, but the subset and the corresponding set may be equal. The use of the terms "first" and "second" are generally considered to denote one ore more objects in a set, and there can be an infinite or appropriate number of objects (e.g., a first, a second, a third, . . . nth, etc.).

Conjunctive language, such as phrases of the form "at least one of A, B, and C," or "at least one of A, B and C," unless specifically stated otherwise, is understood with the context as used in general to present that a term may be either A or B or C, or any non-empty subset of the set of A and B and C. Generally, such conjunctive language is not intended to imply that certain embodiments require at least one of A, at least one of B, and at least one of C each to be present.

Operations of processes described herein can be performed in any appropriate order unless otherwise indicated herein or otherwise clearly contradicted by context. Processes described herein (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory.

The use of any and all examples, or exemplary language (e.g., "such as") provided herein, is intended to better illuminate embodiments of the invention and does not pose a limitation on the scope of the invention unless otherwise claimed generally. No language in the specification should be construed as indicating any non-claimed element as essential to the practice of the invention.

Embodiments of this disclosure are described herein, including the best mode known to the inventors for carrying out the invention. Variations of those embodiments may become apparent to those of ordinary skill in the art upon reading the preceding detailed description. The inventors expect skilled artisans to employ such variations as appropriate and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A computer-implemented method, comprising:
under the control of one or more computer systems configured with executable instructions,
receiving a first request to process first data according to the first request;
determining an amount of Graphics Processing Unit (GPU) resources on a same GPU to process the first request, wherein determining the amount of GPU resources includes predicting an expected resource usage based on the first request;
determining original available GPU resources on the same GPU operably interconnected with a virtual host;
associating the first request and the first data with the original available GPU resources being at least the amount of GPU resources to process the first request;
receiving a second request to process second data according to the second request;
determining an amount of GPU resources to process the second request, wherein determining the amount of GPU resources on the same GPU includes predicting an expected resource usage based on the second request;
determining remaining available GPU resources on the same GPU, wherein the remaining available GPU resources include at least the difference between the original available GPU resources and the amount of GPU resources to process the second request on the same GPU; and
as a result of determining the remaining available GPU resources, associating the second request and the second data with the remaining available GPU resources on the same GPU.

2. The computer-implemented method of claim 1, wherein at least one of the first request and the second request are the same request and the first data and the second data are the same data.

3. The computer-implemented method of claim 1, wherein the same GPU is operably interconnected with a data store configured to retain the first request and the second request; and wherein the computer-implemented method further includes at least one of processing the second data according to the first request and processing the first data according to the second request.

4. The computer-implemented method of claim 1, wherein the computer-implemented method further includes transmitting the processed first request and the processed second request.

5. A system, comprising:
   at least one hardware computing device with associated memory configured to implement one or more services, wherein the one or more services are configured to:
   receive, from a first user device, a first request to process first data according to the first request;
   determine, at a queueing system, an amount of Graphics Processing Unit (GPU) resources on a same GPU to process the first request, wherein determining the amount of GPU resources includes the one or more services being further configured to predict an expected resource usage based on the first request;
   determine original available GPU resources on the same GPU operably interconnected with a virtual host;
   associate the first request and the first data with the original available GPU resources being at least the amount of GPU resources to process the first request;
   receive, from a second user device, a second request to process second data according to the second request;
   determine, at the queueing system, an amount of GPU resources to process the second request, wherein determining the amount of GPU resources on the same GPU includes the one or more services being further configured to predict an expected resource usage based on the second request;
   determine remaining available GPU resources on the same GPU, wherein the remaining available GPU resources include at least the difference between the original available GPU resources and the amount of GPU resources to process the second request on the same GPU; and
   as a result of determining the remaining available GPU resources, associate the second request and the second data with the remaining available GPU resources on the same GPU.

6. The system of claim 5, wherein the one or more services are further configured to determine at least one of the first user device and the second user device are the same user device, the first request and the second request are the same request, and the first data and the second data are the same data.

7. The system of claim 5, wherein the same GPU is operably interconnected with a data store configured to retain the first request and the second request; and wherein the computer-implemented method further includes at least one of processing the second data according to the first request and processing the first data according to the second request.

8. The system of claim 5, wherein the one or more services are further configured to transmit, from a scheduling dataset system, the processed first request and the processed second request.

9. A non-transitory computer-readable storage medium having stored thereon executable instructions that, when executed by one or more processors of a computer system, cause the computer system to at least:
   receive a first request to process first data according to the first request;
   determine an amount of Graphics Processing Unit (GPU) resources on a same GPU to process the first request, wherein determining the amount of GPU resources includes predict an expected resource usage based on the first request;
   determine original available GPU resources on the same GPU operably interconnected with a virtual host;
   associate the first request and the first data with the original available GPU resources being at least the amount of GPU resources to process the first request;
   receiving a second request to process second data according to the second request;
   determine an amount of GPU resources to process the second request, wherein determining the amount of GPU resources on the same GPU includes predicting an expected resource usage based on the second request;
   determine remaining available GPU resources on the same GPU, wherein the remaining available GPU resources include at least the difference between the original available GPU resources and the amount of GPU resources to process the second request on the same GPU; and
   as a result of determining the remaining available GPU resources, associating the second request and the second data with the remaining available GPU resources on the same GPU.

10. The non-transitory computer-readable storage medium of claim 9, wherein the instructions further comprise instructions that, when executed by the one or more processors, cause the computer system to determine at least one of the first request and the second request are the same request and the first data and the second data are the same data.

11. The non-transitory computer-readable storage medium of claim 9, wherein the same GPU is operably interconnected with a data store configured to retain the first request and the second request; and wherein the computer-implemented method further includes at least one of processing the second data according to the first request and processing the first data according to the second request.

12. The non-transitory computer-readable storage medium of claim 9, wherein the instructions further comprise instructions that, when executed by the one or more processors, cause the computer system to transmit the processed first request and the processed second request.

* * * * *